United States Patent Office 3,684,537
Patented Aug. 15, 1972

3,684,537
NICKEL-BASE METALLOCERAMIC STRENGTHENING MATERIAL
Olga Evgenievna Kestner, ulitsa Baimana 43/15, kv. 12; Alexei Sergeevich Frolov, Izmailovsky prospekt 119, kv. 23; Vasily Ivanovich Vinokurov, Spartakovskaya ulitsa 20/34, kv. 39; Mikhail Georgievich Trofimov, 9 ulitsa Sokolinogory 1, kv. 18; Roza Fedorovna Kostechko, 13 Parkovaya ulitsa 31, korpus 1, kv. 92; Valentin Nikiforovich Pyanov, Zavodskaya ulitsa 17, kv. 37; Jury Ivanovich Golovkin, 13 Parkovaya ulitsa 13, korpus 1, kv. 18; Vladimir Borisovich Abakumov, 7 Novo-Ostankinsky Proezd 3/3, kv. 5; and Anatoly Alexeevich Shagurin, Izmailovsky bulvar 31/14, kv. 48, all of Moscow, U.S.S.R.; and Vladimir Alexeevich Lotarev, Zaporozhie, ulitsa Uralskaya 3; Anatoly Alexeevich Yakovlev, Zaporozhie ulitsa 8, Marta 66, kv. 12; Vyacheslav Sergeevich Popov, Zaporozhie, ulitsa Lermontova 19, kv. 28; and Zinaida Sergeevna Narogskaya, Zaporozhie, ulitsa karpenko-karogo 13, kv. 70, all of Zaporozhie, U.S.S.R.
No Drawing. Filed Aug. 28, 1969, Ser. No. 853,975
Int. Cl. C04b 35/52
U.S. Cl. 106—56          1 Claim

ABSTRACT OF THE DISCLOSURE

A nickel-base metalloceramic sealing material, whose composition comprises nickel, copper, boron nitride, graphite and sodium silicate and operating under conditions of being exposed to the action of a high-temperature gas flow.

---

The present invention relates to nickel-base metalloceramic sealing materials employed for coating machine parts which, when operating, are exposed to a gas flow having a temperature not over 650° C., for example, in labyrinths and compressors of turbines.

Known in the art is a nickel-base metalloceramic sealing material whose composition comprises copper and boron nitride and which is used for coating machine parts which in the course of operation are exposed to a high-temperature gas flow.

The material known heretofore is fixed on machine parts mechanically, which fact is responsible for such parts becoming considerably heavier. Moreover, friction results in a premature wear of the mated machine parts.

It is an object of the present invention to provide such a nickel-base metalloceramic sealing material which would not cause wear of the mated part, would not require mechanical fixing to the machine part being coated therewith, and, hence, would not make the latter heavier.

In accordance with said and other objects, the nickel-base metalloceramic sealing material proposed herein, to be applied onto machine parts that are to operate under conditions of being exposed to the effect of a gas flow having a temperature not over 650° C., comprises copper and boron nitride and, in addition, according to the invention, also comprises graphite and sodium silicate.

It is expedient to use the material containing 35–60 percent of nickel, 10–30 percent of copper, 5–20 percent of boron nitride, 3–15 percent of graphite and 15–35 percent of sodium silicate.

The material proposed herein is prepared by mixing powdered copper-nickel alloy with powdered graphite and boron nitride. To the mixture thus obtained sodium silicate solution is added to yield a dough-like mass which is then extruded and the rods thus produced are subjected to thermal treatment.

The material in the form of rods is employed for coating machine parts, for example, by means of flame spraying techniques.

Given hereinbelow is a description of an exemplary embodiment of the present invention, wherein one specific composition of the alloy and its properties are disclosed by way of illustration.

A dry charge composed of 20–22 percent of copper, 15–18 percent of boron nitride, 10–12 percent of graphite, the rest being nickel, is mixed with sodium silicate solution. The dry charge is taken in an amount of 72 percent, and sodium silicate solution 28 percent. From the resulting mixture rods of a certain length (0.5–0.6 m.) are produced by extrusion, which are then dried in cabinet driers.

The material after being sprayed onto machine parts has the following composition: 23–25 percent of copper, 7–9 percent of boron nitride, 3–5 percent of graphite, 7–9 percent of silicon dioxide, the balance being nickel.

The material thus obtained has the following properties:

density, 3.5–4.0 g./cu. cm.,
strength, 10–15 kg./sq. mm.,
thermal shock resistance at temperature fluctuations within 20⇌600° C., up to 600 cycles without destruction,
gas corrosion resistance at 600° C. after 100 hours, characterized by gain in weight (in g./sq. m.), 119–125, and after 200 hours, 168–190.

After 200 hours the state of the material becomes stabilized and after up to 100 hours of exposure its weight remains practically unchanged.

No corrosion of the material was detected after 30 days of exposure in a moist atmosphere at room temperature.

The tests of the present material have shown, that the coating made of it, after prolonged operation under the conditions of being exposed to the action of a high-temperature (550 to 650° C.) gas flow, did not wear and did not cause heat colors on mated machine parts when the latter cut into the coating; nor did it exfoliate from the machine parts onto which it had been sprayed.

What is claimed is:
1. A nickel-base metalloceramic sealing material, to be applied onto machine parts operating under exposure to a gas flow having a temperature not over 650° C., which comprises 35–60 percent nickel, 10–30 percent copper, 5–20 percent boron nitride, 3–15 percent graphite and 15–35 percent sodium silicate.

References Cited

UNITED STATES PATENTS 2,904,449  9/1959  Bradstreet _____ 106—55
3,419,415  12/1968  Dittrich _____ 106—56

JAMES E. POER, Primary Examiner

U.S. Cl. X.R.

106—84